(12) United States Patent
Wang

(10) Patent No.: US 7,656,531 B2
(45) Date of Patent: Feb. 2, 2010

(54) HOLDING APPARATUS FOR SPECTRUM MEASUREMENT

(75) Inventor: Chung-Pei Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/142,164

(22) Filed: Jun. 19, 2008

(65) Prior Publication Data

US 2009/0066945 A1     Mar. 12, 2009

(30) Foreign Application Priority Data

Sep. 11, 2007    (CN)    ............ 200710201645

(51) Int. Cl.
*G01N 21/25* (2006.01)
(52) U.S. Cl. .................... 356/418; 356/419
(58) Field of Classification Search ............ 356/418, 356/419, 423
See application file for complete search history.

(56) References Cited

U.S. PATENT DOCUMENTS

| | | | | |
|---|---|---|---|---|
| 3,609,047 A | * | 9/1971 | Marlow | 356/434 |
| 3,744,918 A | * | 7/1973 | Jacobsson | 356/418 |
| 5,426,576 A | * | 6/1995 | Hewlett | 362/293 |
| 5,940,183 A | * | 8/1999 | Miller | 356/418 |
| 5,986,767 A | * | 11/1999 | Nakano et al. | 356/419 |
| 6,914,734 B1 | * | 7/2005 | Kao et al. | 359/892 |
| 2009/0103108 A1 | * | 4/2009 | Huang | 356/612 |

\* cited by examiner

*Primary Examiner*—Roy Punnoose
(74) *Attorney, Agent, or Firm*—Andrew C. Cheng

(57) ABSTRACT

A holding apparatus (40) for spectrum measurement of optical elements includes a fixed board (11) having a first through hole (111), and a receiving board (12) having a plurality of receiving holes (120) with different sizes configured for holding different optical elements. The receiving board is coupled to the fixed board and rotatable relative to the fixed board about a first axis. The receiving holes are centered on a first imaginary circle which is centered on the first axis. A distance between a center of the first through hole and the axis is equal to a radius of the first imaginary circle.

18 Claims, 5 Drawing Sheets

HOLDING APPARATUS FOR SPECTRUM MEASUREMENT

BACKGROUND

1. Field of the Invention

The present invention relates to spectrometers and spectrum analysis, and particularly, to a holding apparatus for holding and positioning samples for spectrum analysis.

2. Description of Related Art

Spectrometers are used in analyzing optical performance of optical elements, such as filters and film coated lenses. In spectrum analysis, a light beam is passed through an optical element, and the spectrum of the light beam transmitted through the optical element indicates the optical performance of the optical element.

Generally, a holding apparatus utilized for spectrum analysis can only hold one optical element.

Therefore, what is needed is a holding apparatus which can hold as many optical elements as possible to increase efficiency of spectrum measurement.

SUMMARY

A holding apparatus for spectrum measurement of optical elements includes a fixed board having a first through hole, and a receiving board having a plurality of receiving holes with different sizes configured for holding different optical elements. The receiving board is coupled to the fixed board and rotatable relative to the fixed board about a first axis. The receiving holes are centered on a first imaginary circle which is centered on the first axis. A distance between a center of the first through hole and the axis is equal to a radius of the first imaginary circle.

BRIEF DESCRIPTION OF THE DRAWINGS

Many aspects of the present holding apparatus can be better understood with reference to the following drawings. The components in the drawings are not necessarily drawn to scale, the emphasis instead being placed upon clearly illustrating the principles of the present holding apparatus. Moreover, in the drawings, like reference numerals designate corresponding parts throughout the several views.

DETAILED DESCRIPTION OF THE INVENTION

Reference will now be made to the drawings to describe in detail of the preferred embodiments of the present holding apparatus for spectrum measurement.

Figure 1:
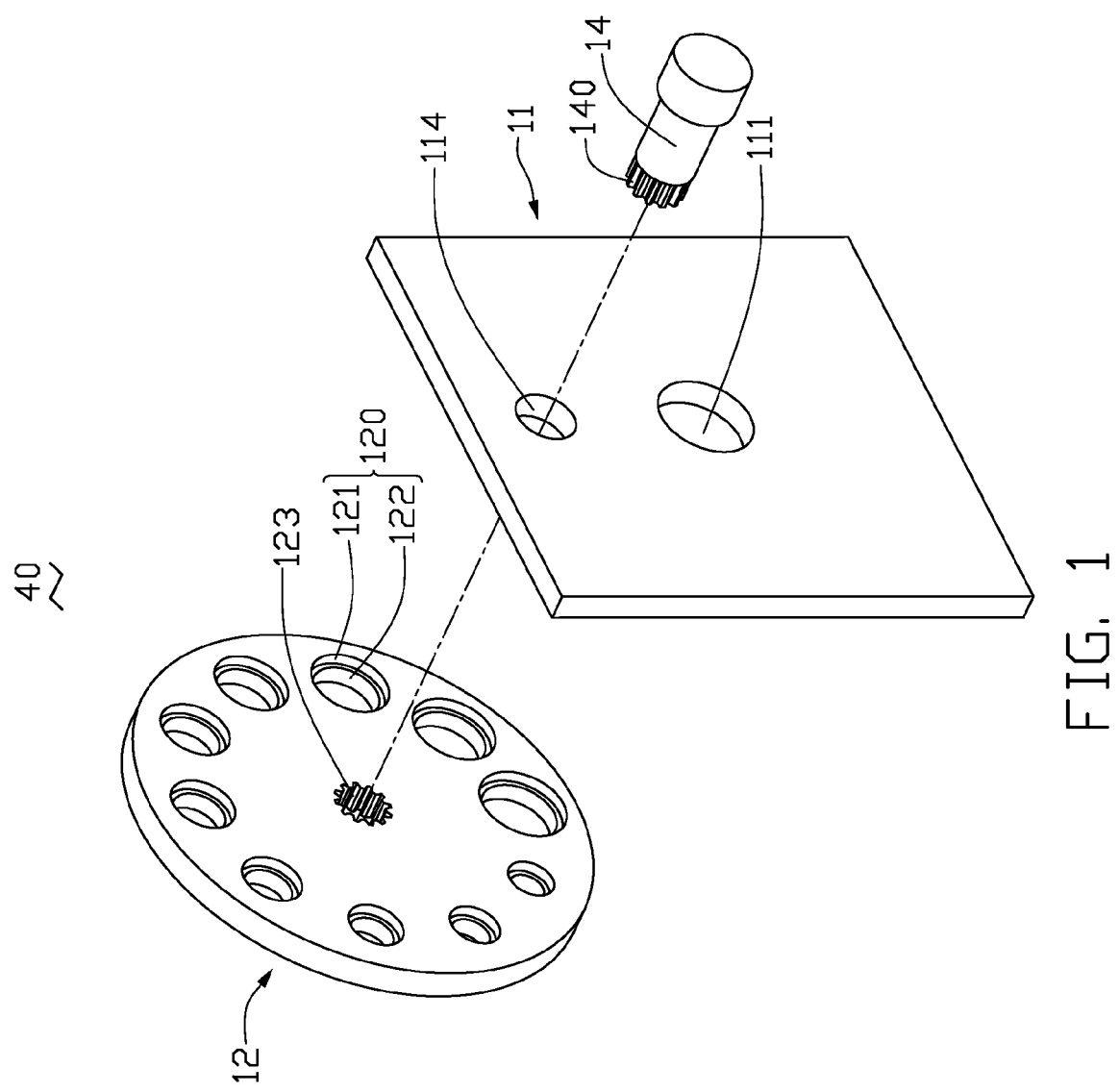
FIG. 1 is an exploded isometric view of a holding apparatus for spectrum measurement in accordance with a first embodiment of the present invention.

Referring to FIG. 1, a holding apparatus 40 for spectrum measurement, according to a first present embodiment, includes a fixed board 11, a receiving board 12, and a first guide pin 14.

In the present embodiment, the fixed board 11 is substantially square shaped. A first through hole 111 is defined at the center of the fixed board 11. A first pinhole 114 is defined at the periphery portion of the fixed board 11.

The receiving board 12 is substantially circular shaped. A plurality of receiving holes 120 configured for accommodating optical elements is defined at the periphery portion of the receiving board 12. Size of each of the receiving holes 120 is different from each other. Each of the receiving holes 120 includes a first cylindrical receiving portion 121 and a second cylindrical receiving portion 122. The second cylindrical receiving portion 122 is in communication with the first cylindrical receiving portion 121. In the present embodiment, the second cylindrical receiving portion 122 is coaxial to the first cylindrical receiving portion 121. The diameter of the second cylindrical receiving portion 122 is smaller than that of the first cylindrical receiving portion 121. A first toothed hole 123 is defined at the center of the receiving board 12. The distance between the center of each of the receiving holes 120 and the center of the receiving board 12 is equal to the distance between the center of the first pinhole 114 and the center of the fixed board 11.

The first guide pin 14 includes a toothed end 140 which can be matingly meshed with the first toothed hole 123. The fixed board 11 and the receiving board 12 are joined together by inserting the first guide pin 14 into the first pinhole 114 and the first toothed hole 123 in succession and meshing the toothed end 140 with the first toothed hole 123. The receiving space 121 is closer to the fixed board 11 than the second cylindrical receiving portion 122.

In operation, the optical elements are received in the cylinder receiving spaces 121. The position of the receiving board 12 can be adjusted by turning the first guide pin 14. The toothed end 140 transmits rotational force of the first guide pin 14 to the receiving board 12 by engaging in the first toothed hole 123. Due to the rotation of the receiving board 12, the first through hole 111 on the fixed board 11 can be selectively aligned with one of the receiving holes 120 on the receiving board 12.

Figure 2:
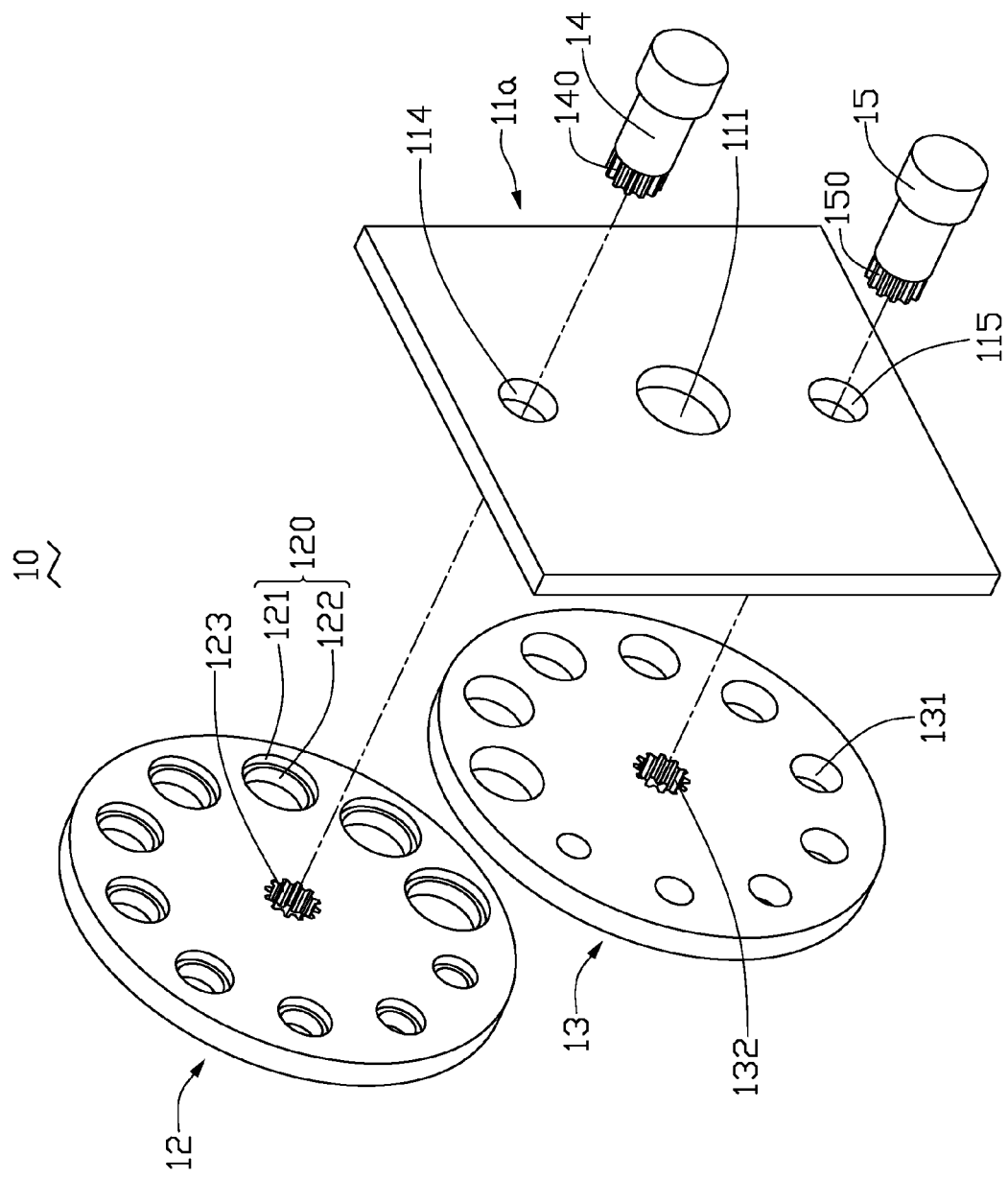
FIG. 2 is an exploded isometric view of a holding apparatus for spectrum measurement in accordance with a second embodiment of the present invention.
Figure 3:
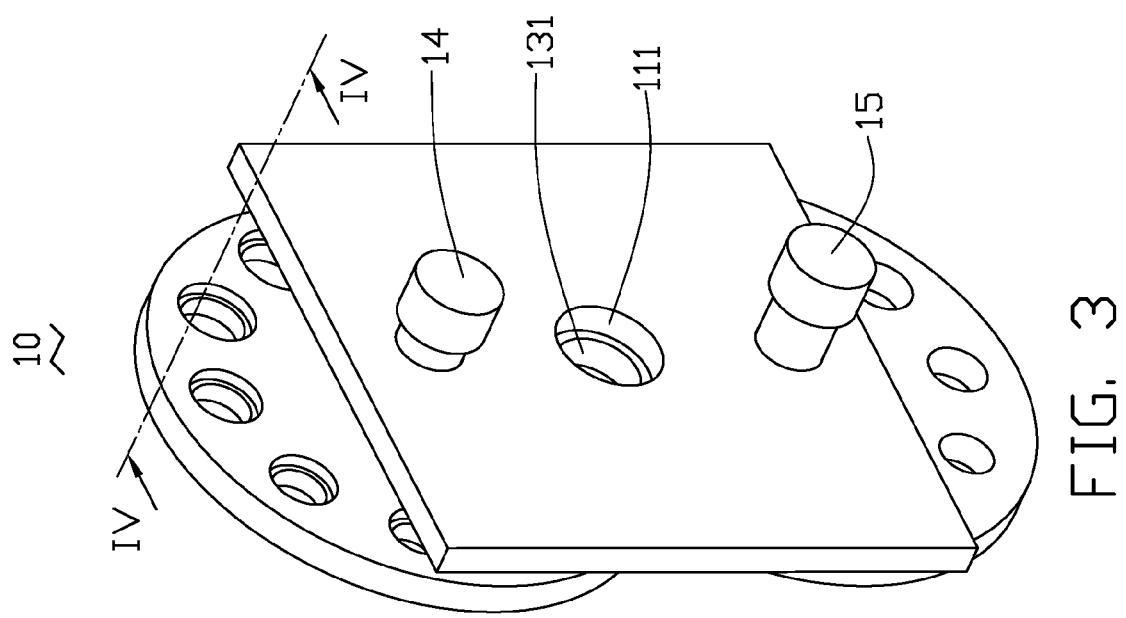
FIG. 3 is a schematic, isometric view of the holding apparatus in FIG. 2.
Figure 4:
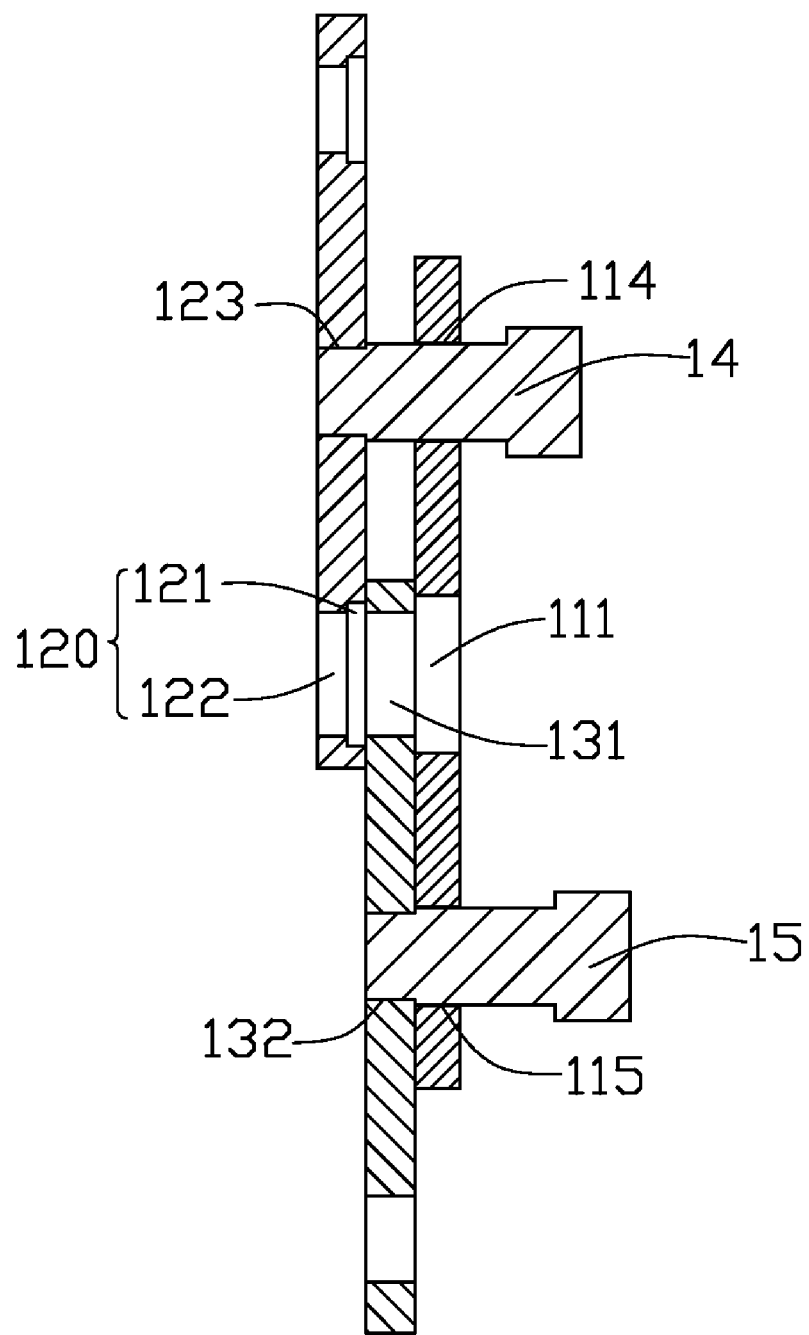
FIG. 4 is a cross-sectional view taken along line IV-IV of FIG. 3.

Referring to FIGS. 2 to 4, a holding apparatus 10, according to a second present embodiment, includes a fixed board 11a, a receiving board 12, a light-blocking board 13, a first guide pin 14, and a second guide pin 15. The structure of the fixed board 11a is similar with that of the fixed board 11 in the first embodiment, the difference is that a second pinhole 115 is defined on the periphery portion of the fixed board 11a. In the present embodiment, the first through hole 111 is at the center of the fixed board 11a between the first pinhole 114 and the second pinhole 115.

The light-blocking board 13 is configured for limiting the amount of light passing through the optical elements held in the apparatus 20. Referring to FIG. 2, a plurality of second through holes 131 corresponding to the plurality of the receiving holes 120 is defined at the periphery portion of the light-blocking board 13. The diameter of each of the second through holes 131 is smaller than that of the corresponding receiving hole 120 (refer to FIGS. 3 and 4). The diameter of each of the second through holes 131 is also smaller than that of the first through hole 111. The distance between the center of each of the second through holes 131 and the center of the light-blocking board 13 is equal to the distance between the center of the second pinhole 115 and the center of the first through hole 111. A second toothed hole 132 is defined at the center of the light-blocking board 13.

The second guide pin 15 includes a toothed end 150 configured for matingly meshed with the second toothed hole 132.

The difference between the holding apparatus 40 of the first embodiment and the holding apparatus 10 of the second embodiment is that the light-blocking board 13 is set between the fixed board 11a and the receiving board 12. The fixed board 11a and the light-blocking board 13 are joined together by inserting the second guide pin 15 into the second pinhole 115 and the second toothed hole 132 in succession and meshing the toothed end 150 with the second toothed hole 132.

In operation, the optical elements are received in the cylinder receiving spaces 121. The position of the light blocking board 13, and the receiving board 12 can be adjusted by turning the first guide pin 14 and the second guide pin 15. Due to the rotation of the receiving board 12 and the light-blocking board 13, the first through hole 111 on the fixed board 11a can be selectively aligned with one of the receiving holes 120 and the corresponding second through hole 131.

Figure 5:
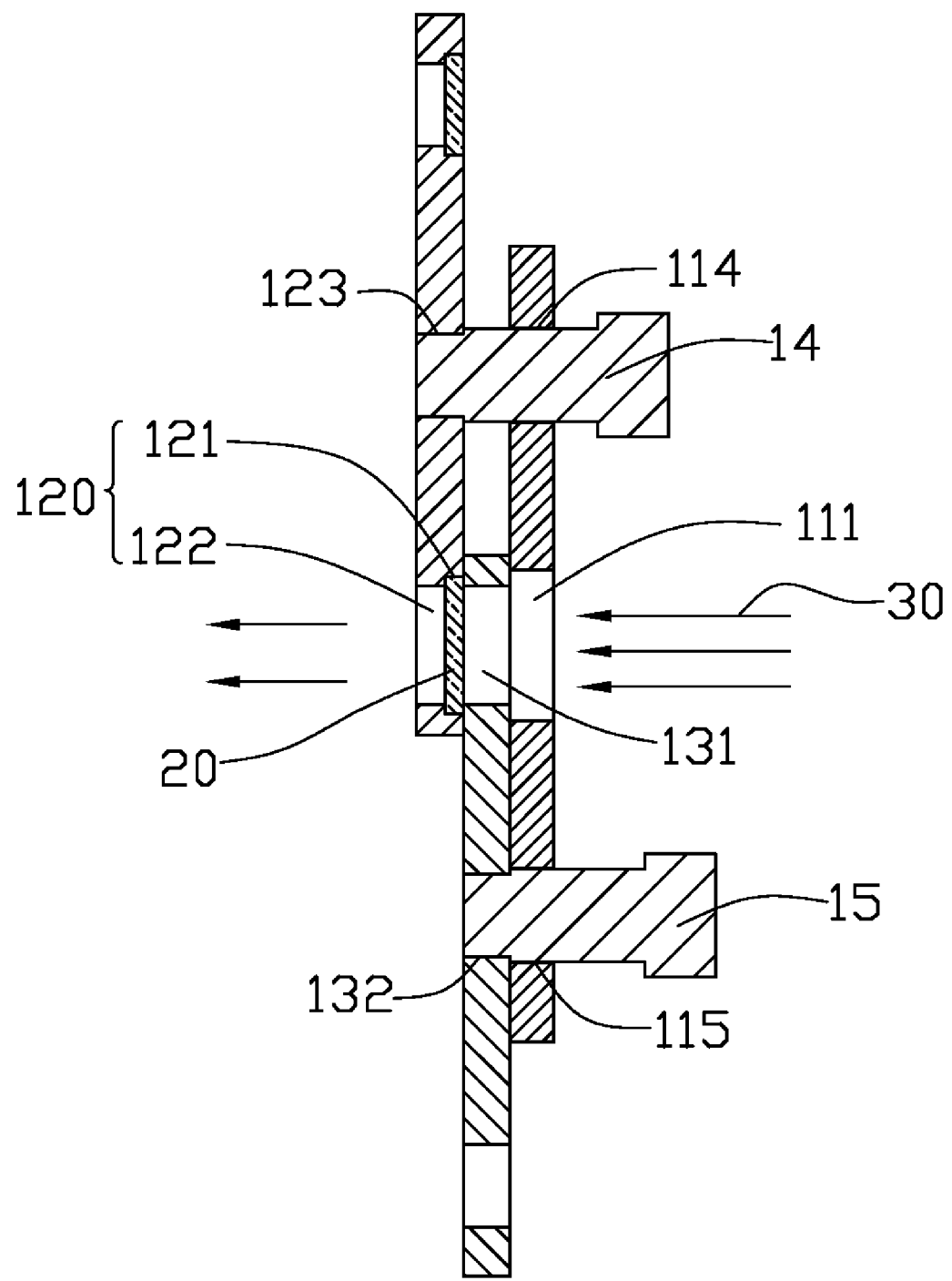
FIG. 5 is the cross-sectional view taken along line IV-IV of FIG. 3, showing an optical element held in the holding apparatus.

Referring to FIG. 5, before start of the spectrum measurement, at least one optical element is placed in the holding apparatus 10 by following steps:

In step 1, the first guide pin 14 and the second guide pin 15 are taken out, thereby the fixed board 11a, the receiving board 12, the light-blocking board 13 are separated.

In step 2, an optical element 20 is placed in one of the cylinder receiving spaces 121, thereby the optical element 20 is held in the first cylindrical receiving portion 121.

In step 3, the holding apparatus 10 is assembled. Firstly, the fixed board 11a and the light-blocking board 13 are joined together by inserting the second guide pin 15 into the second pinhole 115 and the second toothed hole 132 in succession and meshing the toothed end 150 with the second toothed hole 132. Secondly, the fixed board 11a and the receiving board 12 are joined together by inserting the first guide pin 14 into the first pinhole 114 and the first toothed hole 123 in succession and meshing the toothed end 140 with the first toothed hole 123. Finally, the first through hole 111 on the fixed board 11a is selectively aligned with the receiving holes 120 holding the optical element 20 and the corresponding second through hole 131.

Referring to FIG. 5, in a spectrum measurement process, a light beam is passed through the optical element 20, and the spectrum of the light transmitted through the optical element 20 can be obtained and analyzed by spectrometers.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A holding apparatus for spectrum measurement of optical elements, comprising:
    a fixed board having a first through hole, and
    a receiving board having a plurality of receiving holes with different sizes configured for holding different optical elements, the receiving board being coupled to the fixed board and rotatable relative to the fixed board about a first axis, the receiving holes centered on a first imaginary circle which is centered on the first axis;
    wherein a distance between a center of the first through hole and the axis is equal to a radius of the first imaginary circle.

2. The holding apparatus as described in claim 1, wherein the receiving board comprises a circular step formed in each of the receiving holes.

3. The holding apparatus as described in claim 2, wherein the circular step has a step surface facing to the fixed board.

4. The holding apparatus as described in claim 1, further comprising a first shaft, the receiving board is secured to and driven to rotate by the first shaft.

5. The holding apparatus as described in claim 1, further comprising a light-blocking board having a plurality of second through holes with different sizes corresponding to the receiving holes, the light-blocking board being coupled to and rotatable relative to the fixed board about a second axis, the second through holes centered on a second imaginary circle which is centered on the second axis and a distance between the center of the first through hole and the second axis being equal to a radius of the second imaginary circle.

6. The holding apparatus as described in claim 5, wherein the light-blocking board is set between the fixed board and the receiving board.

7. The holding apparatus as described in claim 5, wherein a diameter of each of the second through holes is smaller than that of the corresponding receiving hole.

8. The holding apparatus as described in claim 5, wherein a diameter of each of the second through holes is smaller than that of the first through hole.

9. The holding apparatus as described in claim 5, further comprising a second shaft, the light-blocking board is secured to and driven to rotate by the second shaft.

10. A holding apparatus for spectrum measurement of optical elements, comprising:
    a fixed board having a first through hole,
    a shaft
    a receiving board having a plurality of receiving holes with different sizes configured for holding different optical elements, the receiving board being coupled to the fixed board using the shaft, the receiving board being rotatable relative to the receiving board about the shaft, and the first through hole being selectable coaxially aligned with each of the receiving holes.

11. The holding apparatus as described in claim 10, wherein each of the receiving holes comprises a first cylindrical receiving portion and a second cylindrical receiving portion, the second cylindrical receiving portion is coaxial to the first cylinder receiving space, a diameter of the second cylindrical receiving portion is smaller than that of the first cylindrical receiving portion.

12. The holding apparatus as described in claim 10, wherein the first cylindrical receiving portion is closer to the fixed board than the second cylindrical receiving portion.

13. The holding apparatus as described in claim 10, wherein the shaft and the receiving board are meshed with each other.

14. The holding apparatus as described in claim 10, further comprising another shaft and a light-blocking board having a plurality of second through holes with different sizes corresponding to the receiving holes, the light-blocking board being joined with the fixed board by the another shaft, and the first through hole being selectively coaxially aligned with each of the second through holes and each of the receiving holes.

15. The holding apparatus as described in claim 14, wherein the light-blocking board is set between the fixed board and the receiving board.

16. The holding apparatus as described in claim 14, wherein a diameter of each of the second through holes is smaller than that of the corresponding receiving hole.

17. The holding apparatus as described in claim 14, wherein a diameter of each of the second through holes is smaller than that of the first through hole.

18. The holding apparatus as described in claim 14, wherein the another shaft and the light-blocking board are tooth meshed with each other.

* * * * *